US010203116B2

(12) United States Patent
Kuhn (10) Patent No.: US 10,203,116 B2
(45) Date of Patent: Feb. 12, 2019

(54) SCREW TOP GRATE FOR PORTABLE STOVE

(71) Applicant: Sterno Products, LLC., Corona, CA (US)

(72) Inventor: Jarrod Kuhn, Corona, CA (US)

(73) Assignee: Sterno Products, LLC., Corona, CA (US)

( * ) Notice: Subject to any disclaimer, the term of this patent is extended or adjusted under 35 U.S.C. 154(b) by 415 days.

(21) Appl. No.: 15/050,043

(22) Filed: Feb. 22, 2016

(65) Prior Publication Data

US 2016/0298854 A1 Oct. 13, 2016

Related U.S. Application Data

(60) Provisional application No. 62/145,226, filed on Apr. 9, 2015.

(51) Int. Cl.
| | |
|---|---|
| A47J 36/34 | (2006.01) |
| F24B 1/182 | (2006.01) |
| A47J 37/07 | (2006.01) |
| F24B 1/02 | (2006.01) |
| F24C 1/16 | (2006.01) |
| F24C 5/20 | (2006.01) |
| F24C 3/14 | (2006.01) |
| F24B 1/193 | (2006.01) |

(52) U.S. Cl.
CPC .............. *F24B 1/182* (2013.01); *A47J 36/34* (2013.01); *A47J 37/0763* (2013.01); *F24B 1/022* (2013.01); *A47J 2037/0777* (2013.01); *F24B 1/193* (2013.01); *F24C 1/16* (2013.01); *F24C 3/14* (2013.01); *F24C 5/20* (2013.01)

(58) Field of Classification Search
CPC .......... F24B 1/182; F24B 1/022; F24B 1/193; F24B 1/199; A47J 36/34; A47J 37/0763; A47J 2037/0777
USPC ................. 126/9 B, 262, 26, 29, 43, 45, 49; 248/121.1, 128, 150, 176.2
IPC ............... F24B 1/182,1/02, 1/193, 1/199, 1/16; F24C 5/20, 3/14; A47J 36/34, 37/07
See application file for complete search history.

(56) References Cited

U.S. PATENT DOCUMENTS

| | | | | |
|---|---|---|---|---|
| 426,802 | A * | 4/1890 | Hammer | F24C 5/20 |
| | | | | 126/43 |
| 538,096 | A | 4/1895 | Boeck | |
| 943,569 | A * | 12/1909 | Scamardi | F24C 3/14 |
| | | | | 126/38 |
| 3,025,849 | A * | 3/1962 | Zimmerman | F24C 1/16 |
| | | | | 126/25 A |

(Continued)

FOREIGN PATENT DOCUMENTS

| | | |
|---|---|---|
| CH | 689609 A5 | 7/1999 |
| JP | 09308582 A * | 12/1997 |

*Primary Examiner* — Gregory Huson
*Assistant Examiner* — Daniel E Namay
(74) *Attorney, Agent, or Firm* — Stetina Brunda Garred & Brucker; Lowell Anderson (57) ABSTRACT

A portable, collapsible holder for a cooking container has a threaded collar that screws onto the neck of a chafing dish fuel container. Three panels are each rotatably connected to the collar with an offset hinge. The panels rotate between a first collapsed position in which the panels contact a top surface of the collar and a second position in which the panels are in a deployed position at an angle of about 105 to 155 degrees outward from the top surface. Rotation stops on the panel and collar limit the rotation.

26 Claims, 6 Drawing Sheets

(56) References Cited

U.S. PATENT DOCUMENTS

| | | |
|---|---|---|
| 3,038,402 A | 6/1962 | Singer |
| 4,526,158 A | 7/1985 | Lee |
| 4,832,295 A | 5/1989 | Wagner |
| 5,287,800 A * | 2/1994 | Orednick ................. A47F 3/14 126/9 R |
| 5,404,864 A | 4/1995 | Kent, Jr. |
| 5,558,008 A | 9/1996 | Jenkins |
| 6,024,082 A | 2/2000 | Straubel et al. |
| 6,035,768 A | 3/2000 | Kaufman |
| 6,065,466 A | 5/2000 | Baykal |
| 6,253,760 B1 | 7/2001 | Mashburn et al. |
| 6,694,912 B2 | 2/2004 | Wesley |
| D491,765 S | 6/2004 | Siegel et al. |
| 6,786,149 B1 | 9/2004 | Lazaroff et al. |
| 7,934,494 B1 | 5/2011 | Schneider |
| 8,695,582 B1 * | 4/2014 | Lin .......................... F24C 3/14 126/30 |
| 2008/0029082 A1 * | 2/2008 | Dowst .................. A47J 27/022 126/9 B |
| 2012/0070556 A1 * | 3/2012 | Wilson .................... A47J 33/00 426/523 |
| 2012/0073570 A1 * | 3/2012 | Wall ....................... A47J 36/26 126/9 R |

\* cited by examiner

SCREW TOP GRATE FOR PORTABLE STOVE

CROSS-REFERENCE TO RELATED APPLICATIONS

The application claims the benefit under 35 U.S.C. § 119(e) to Provisional Patent Application No. 62/145,226 filed Apr. 9, 2015, the entire contents of which are incorporated herein by reference.

STATEMENT RE: FEDERALLY SPONSORED RESEARCH/DEVELOPMENT

Not Applicable

BACKGROUND

A number of patents exist for single burner camping stoves. Early camping stoves often used liquid fuels such as gasoline or kerosene but these presented safety issues because of possible leaking of fuels and the need to pressurize the fuel container to force the fuel into the burner. More recent camping stoves use butane or propane, but these require heavier containers for the pressurized fuel. Regardless of the fuel used the stoves require covers to enclose the fuel and burner assembly and to enclose the grate. The enclosures are sometimes used for form windbreaks for the burners. The resulting stoves, fuel and enclosures are heavy and bulky.

There is a need for a small and portable stove. There is a further need for a lightweight fuel container and stove. There is a further need for a lightweight design that reduces the need for windbreaks and for a stove providing a minimal windbreak.

BRIEF SUMMARY

A collar has internal threads configured to screw onto the threaded neck of a container of chafing dish fuel, such as liquid fuel using a wick for combustion, such as Sterno® brand, glycol-based chafing fuel that uses a wick to ignite and burn the fuel, or the gelled fuels using gelled alcohol or gelled methanol that do not have a wick. These chafing dish fuel containers are typically cylindrical, about three to four inches in diameter, with a top rim the cylindrical wall, with the height varying to accommodate different amounts of fuel. A neck extends from the top of the container about ½ inch, with external threads. To contain the fuel when not in use, a removable, threaded cap covers the neck, or a flanged plug is pressed into the opening in the cap. The preferred fuel is usually glycol-based and sufficiently fluid that capillary action draws them up a wick, and the wick is used for burning the fuel. Adjusting the length of the wick can alter the temperature produced. The wicked fuel has the advantage of combusting outside the fuel container and results in the fuel container being cool enough for a user to pick up and move even after the wick has been burning for quite some time. The wickless fuels burn inside the container and cause the fuel container to become hot to the touch.

The collar has several small panels hinged to the collar with each hinge rotating about an axis located in a common plane but tangential to the circular threads of the collar. The panels are generally planar but offset from the hinge so the panels can lay against the top of the collar or each other in a collapsed configuration. The panels rotate toward the center of the threaded portion of the collar into a collapsed, storage position. The panels rotate away from that threaded portion into a use position, with a rotation stop on the collar and panels positioning the panels in the use position. The juncture of each hinge to the panel is advantageously configured so that when the collar is threaded on the gel container, the portion of the panel at the hinge can rotate against the top rim of the cylindrical container of wicked fuel so the fuel container can help support the panels in the deployed, use position. The panels may be folded against the collar to form a folded assembly about half an inch thick and about four inches in its largest dimension.

A cooking container may be placed inside the deployed panels to rest on the collar or the offset-hinged connection of the panels to the collar. This location allows the panels to act as a windbreak and the panels also help keep the cooking container on the collar to avoid spillage. Advantageously, a container having a bottom that is about 3 and ⅜ inches in diameter rests on the outer ends of the collar or rests on the offset hinges of the panel adjacent the juncture with the collar. This location limits the bottom-diameter of the cooking container but doing so places that container bottom very near the opening of the chafing fuel container and the preferable, wick burning the fuel in the container and that increases heat transfer. This location also places the opening of the fuel container close to the cooking container for wickless fuel containers. The length of the wick may be varied by manually pulling the wick out or pushing it inward to vary the length of burning wick to adjust the heat from the burning fuel. Mechanical adjustments for varying the wick length are known, including knobs rotating shafts with sprockets engaging the wick to alter the wick length. The cooking container advantageously has a recessed bottom with heat transfer elements around a periphery of that bottom to efficiently transfer heat from the burning fuel to the cooking container, with the heat transfer elements also providing some protection against any wind.

A cooking container may also be placed on the top of the deployed panels. To make this arrangement more stable, the top edge of the panels may be textured, such as with a series of notches or other rough surfaces in order to better engage the bottom of the cooking container and restrain relative movement of the cooking container bottom and the panels. The panels are also positioned over-center so they lean outward, away from the collar. An outward angle of about 15° to 30° from the vertical is believed suitable, and an angle of up to about 45° is also believed workable. That corresponds to angles of about 105° to 120° from the collapsed position generally parallel to the top of the collar, and an angle of about 155°, respectively. This range of angles is also believed suitable to allow the panels to act as a partial windbreak for the burning fuel in the fuel container. While larger panel deployment angles are believed workable they are less desirable because of the larger bending forces exerted on the rotating joints when a cooking container rests on the distal ends of the panels. The contact of the offset panel hinges with the rim of the fuel container provides a sturdy brace for the panels and provides a sturdy support for the cooking container placed on top of the collar or panels.

There is thus advantageously provided a portable, collapsible holder for a cooking container with the holder being releasably connectable to a fuel container having a neck and a top rim. The holder includes a collar having an opening therethrough forming an inward facing surface configured to rotatably engage the neck during use of the holder. The opening has a longitudinal axis. Each of several panels are rotatably connected to the collar with an offset hinge. Each panel rotates between a first collapsed position in which the panels are generally parallel to a top surface of the collar and a second position in which the panels are in a deployed position with the panels rotated at an angle of about 105 to 155 degrees outward from the top surface of the collar. A rotation stop on at least one of the panel and collar limits the motion of each of the several panels beyond the deployed position.

In further variations, the collapsible holder has three panels each configured to contact the top surface of the collar in the first, collapsed configuration. When the panels are in the first, collapsed configuration each of the three panels has two opposing sides inclined at an angle of about 120 degrees to each other. Each panel has an outermost side in the second, deployed configuration which outermost sides are in substantially the same plane and orthogonal to the longitudinal axis so a cooking container can rest on those outermost sides. That outermost side may be textured to better engage and hold the coking container during use. The second, deployed position is preferably between about 105 to 125 degrees. Each of the three panels are preferably rotatably connected to a different one of three, equally spaced, outwardly extending projections on the collar, the projections extending outward a distance sufficient to contact a top rim of the fuel container during use of the holder. The opening in the collar may have internal threads configured to threadingly engage mating external threads on the neck of the fuel container during use.

The panels may be each configured to interleave with another panel one of which is in contact with the top surface of the collar in the first, collapsed configuration. In the most preferred embodiment, there are three panels and the collar has an annular shape with three outward extending projections and a different panel rotatably connected to a different one of the three projections, with the threaded opening in the collar has a diameter of about 1 and ⅜ inch with multiple lead threads, and with the collar is made of metal and is less than about ¾ inches thick measured parallel to the longitudinal axis.

There is also provided a portable stove kit, that may include a container of wickless fuel or preferable a container of wicked fuel and a wick, where the fuel container has a neck extending from a top surface of the container. The neck defines an opening for access to the fuel and wick for burning. The container has a top rim connected to that top surface. The kit also includes a collar having an opening extending through the collar and configured to rotatably engage the neck of the container during use. The collar also has several panels each rotatably connected to the collar with an offset hinge. Each panel may rotate between a first collapsed position in which the panels are generally parallel to a top surface of the collar and a second position in which the panels are in a deployed position with the panels rotated at an obtuse angle of about 105 to 155 degrees outward from the top surface of the collar. The collar and panels are configured so at least one of the collar and panels can rest against the top rim when the panels are in the second, deployed position during use. A rotation stop is provided on at least one of the collar and each panel to limit rotation beyond the deployed position of each of the several panels.

In further variations, the kit may also include a cooking container having a bottom configured to fit within a juncture of the panels and the collar when the cooking container during use, with the cooking container advantageously resting on the collar during use. There are preferably three panels each configured to contact the top surface of the collar in the first, collapsed configuration. Each panel advantageously has an outermost side in the second, deployed configuration which outermost sides are in substantially the same plane to support a cooking container on the outermost sides during use. The kit may include a cooking container having a bottom configured to rest upon and extend beyond the three outermost sides of the panels when the panels are in the second, deployed position. The outermost side of at least one panel is preferably textured, such as being notched to increase the engagement with the bottom of the cooking container. Advantageously, when the panels are in the first, collapsed configuration each of the three panels has two opposing sides inclined at an angle of about 120 degrees to each other so all three panels may lay flat against the collar. Preferably, there are three panels, each having a second, deployed position between about 105 to 125 degrees . . . . Advantageously, the collar used in the kit has three panels each rotatably connected to a different one of three, equally spaced, outwardly extending projections of the collar with each of the projections extending outward a distance sufficient to contact the top rim during use of the holder. The collar preferably has internal threads configured to threadingly engage mating external threads on the neck of the fuel container during use. Instead of laying flat against the top surface of the collar, the panels may each be configured to interleave with another panel, at least one of which is in contact with the top surface of the collar in the first, collapsed configuration. Most preferably, wherein there are three panels and the collar has an annular shape with three outward extending projections and a different panel rotatably connected to a different one of the three projections, with a threaded opening in the collar about 1 and ⅜ inch in diameter with internal threads configured to engage mating threads on the neck. The collar is made of metal, preferably aluminum, and is less than about ¾ inches thick measured parallel to the longitudinal axis.

There is thus provided a portable, collapsible holder for a cooking container that has a threaded collar that screws onto the neck of a wicked fuel container, using three panels are each rotatably connected to the collar with an offset hinge. The panels rotate between a first collapsed position in which the panels contact a top surface of the collar and a second position in which the panels are in a deployed position at an angle of about 105 to 155 degrees outward from the top surface. Rotation stops on the panel and collar limit the rotation.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Referring to FIGS. 1-4, a collar 20 has a central opening with internal threads 22a and a plurality of outwardly extending projections 24. A separate panel 30 is connected to each projection to rotate toward an upper surface of the collar 20. As used herein, the terms inner and outer, inward and outward are relative terms giving relative positions or directions toward or away from longitudinal axis 26 through the center of the central opening of collar 20 with the collar 20 being in a plane generally orthogonal to that axis 26. The terms upper, lower, above, below, top, bottom are relative terms giving relative positions or directions along the length of the axis 26, with down and below being in the direction of gravity during use.

A plurality of projections 24 advantageously extend outward, preferably in the plane of the collar 20 and preferably radially outward. The depicted collar 20 has a flat, annular body with three projections 24 spaced equally around the outer periphery of the annular body. But the collar could have various peripheral shapes and the projections 24 could vary in shape as well.

A hole may extend through a width of each projection with a hinge shaft 32 passing through the hole to form a hinge line to which a panel 30 is connected and about which the panel rotates. The hinge shafts 32 may be in the same plane which plane preferably passes through a middle of the thickness of the collar 20 and projections 24. The hinge shafts 32 connect the rotating panels 30 to the projections 24 and collar 20 by passing through holes in a pair of offsetting legs 34 oriented generally perpendicular to the plane containing the panel 30. The legs 34 straddle the outside of one projection 24 with the hinge shaft passing through aligned holes through the legs 34 and projection. The depicted hinge shaft 32 comprises an elongated rivet with enlarged ends on the exterior surface of the legs 34 to prevent removal of the hinge shaft 32, legs 34 and panel 30.

Figure 2:
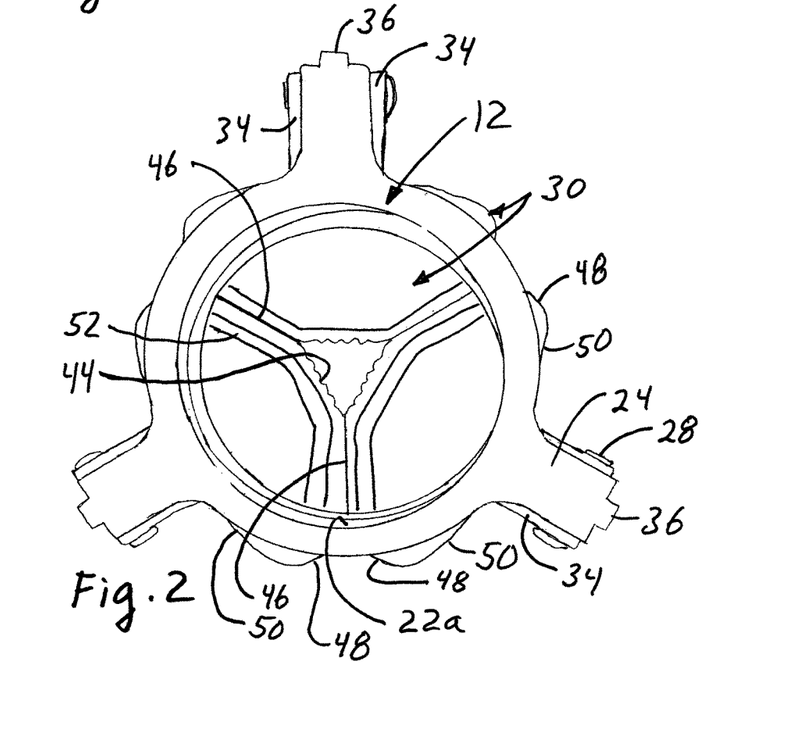
FIG. 2 is a bottom perspective view of the collar and panels of FIG. 1.
Figure 4:
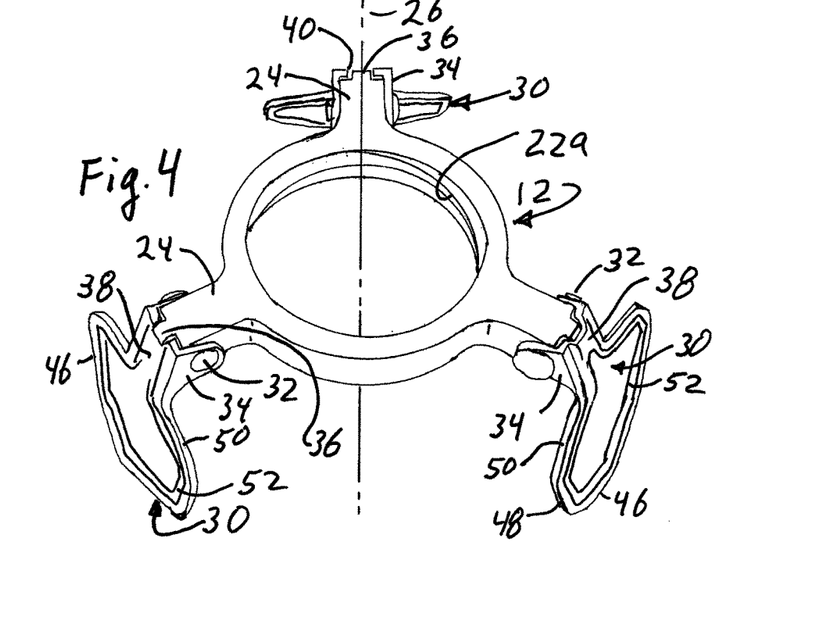
FIG. 4 is a bottom perspective view of the collar and panels of FIG. 3 in a partially deployed configuration.
Figure 5:
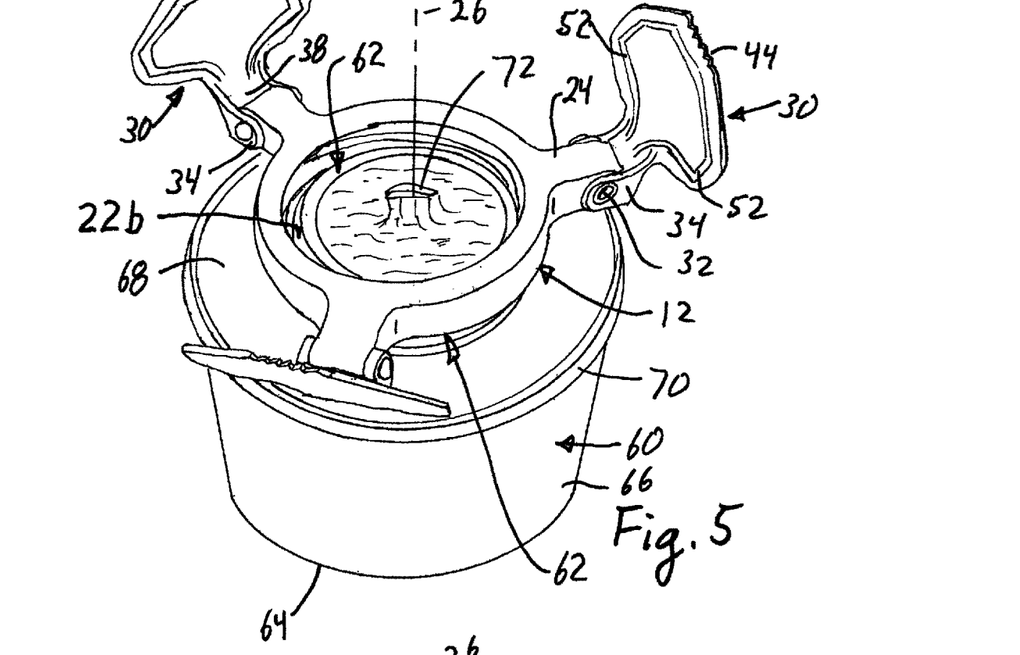
FIG. 5 is an upper perspective view of the collar and panels of FIG. 3 partially connected to a fuel container.

Referring to FIGS. 2 and 4, the outer end of each projection 24 has a rounded top edge and a flat bottom surface, with the rounded edge continuing on opposing sides of the projection to leave an axial oriented ridge 36 at the middle of the bottom surface of the collar. The ridge 36 is parallel to but offset from axis 26. The ridge 36 helps form a rotation stop for the panel 30 as discussed later.

Figure 1:
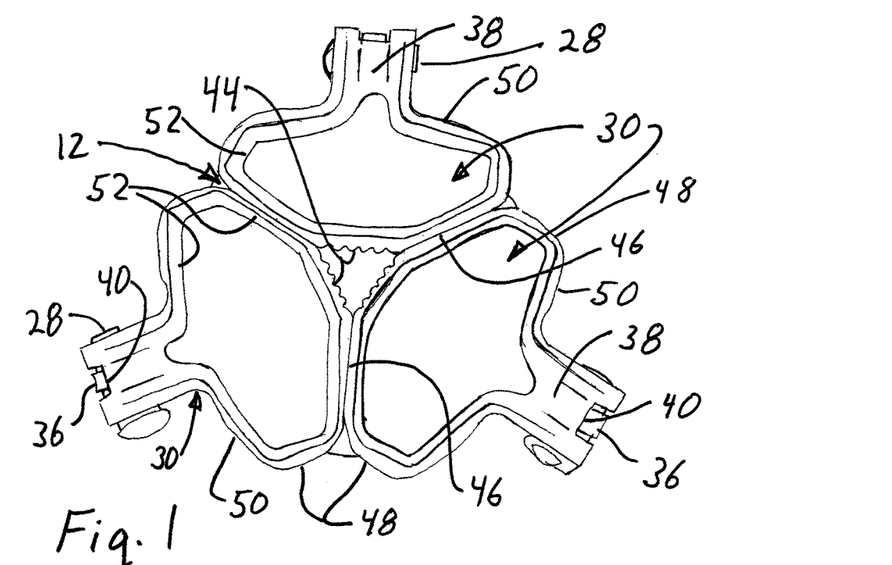
FIG. 1 is a top perspective view of a collar and panels in a collapsed configuration.
Figure 9:
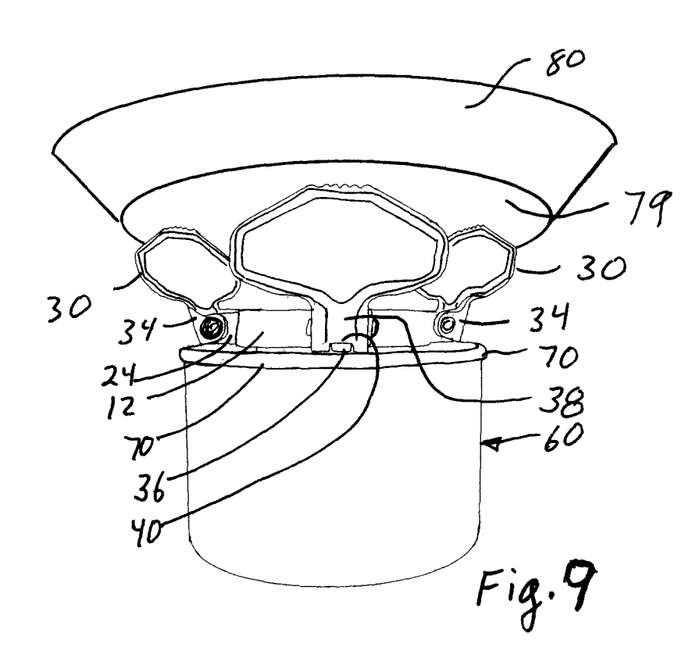
FIG. 9 is a lower perspective view of a cooking container on the panels of FIG. 7.
Figure 10:
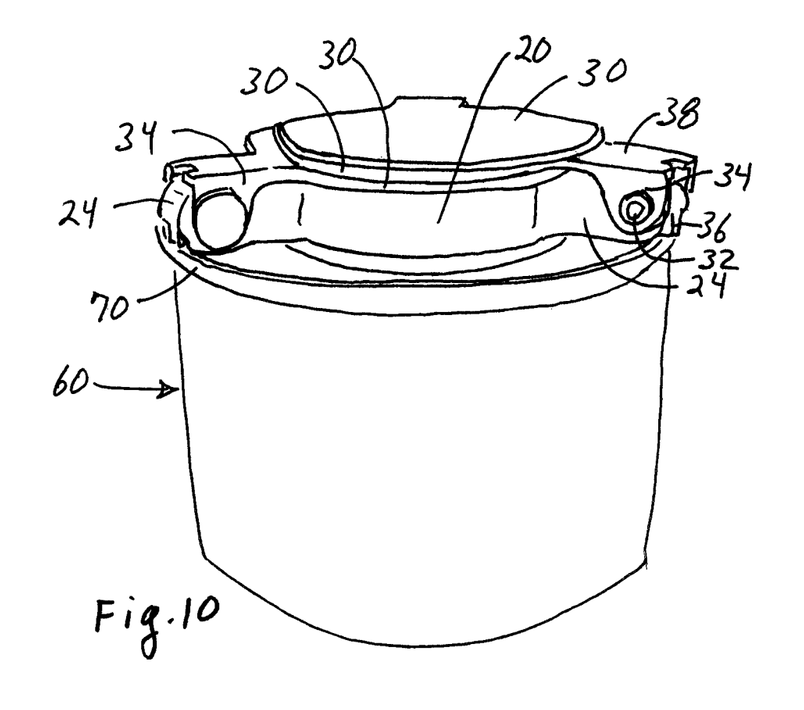
FIG. 10 is an upper perspective view of a cooking container with the panels interleaved.
Figure 11:
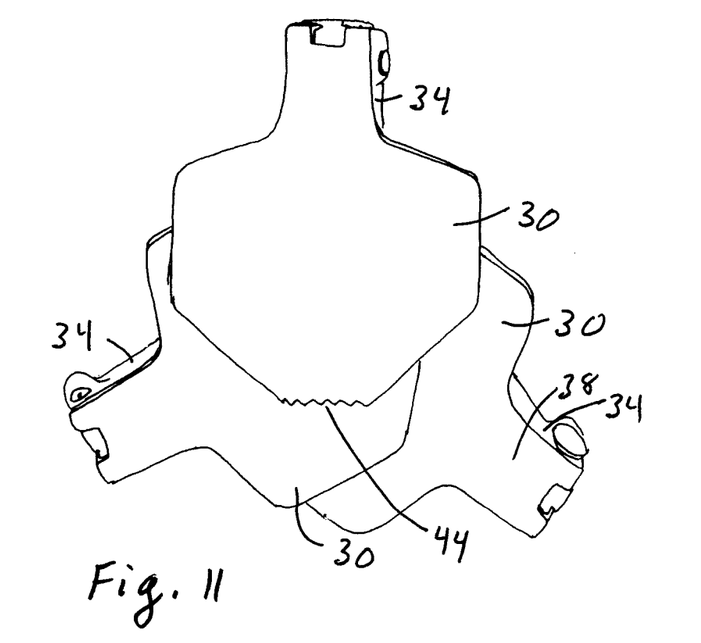
FIG. 11 is a top perspective view of a cooking container with the panels interleaved.

Referring to FIGS. 1-4, the legs 34 are offset from the plane of panels 30 a distance sufficient to allow the panels 30 to lay against the top of the collar 20 as in FIG. 1, or to interleave over each other if the panels 30 overlap one another in the stowed or collapsed position (FIGS. 9-10). The offset between the hinge line of shaft 32 and the panel 30 at the juncture of the legs 34 is thus about the distance between the top of the projection 24 and the center of the shaft 32, which is preferably about half the thickness of the collar 20. The legs 34 on each panel 30 are spaced apart a distance slightly greater than the width of the projection 24 to which the legs are attached, at least for the depicted hinge configuration.

A generally flat tab 38 on the inner side of each panel 30 connects the two legs 34 on the panel to form a connecting structure with a generally U-shaped cross section with the legs 34 forming generally parallel sides of that connecting structure and the tab forming a base of that structure. The inner end of the tab 38 has a notch 40 sized and located to receive the ridge 36 as the panel rotates about the hinge line of shaft 28. The notch 40 abuts the ridge 36 to limit rotation of the panel 30. The ridge 36 advantageously extends parallel to axis 26 or it may have a slight engaging protrusion (not shown) on it that extend outward to contact the bottom of the notch 40 at a discrete angle of rotation.

Referring to FIGS. 1-4 and especially to FIG. 1, the three panels 30 of the depicted embodiment are shown as shaped to fold flat against the top of the collar 20, leaving a triangular space at the center of the opening in the collar around axis 26. When in the collapsed or folded position, each panel 30 has a textured end 44 on its inner end, with two first sides 46 extending from opposing ends of the inner end 44 at an angle of about 120°. Two second sides 48 are generally parallel and extend outward from different ones of the outer end of the first side 46. Two third sides 50 each join a different one of the second sides 48 to the inner end of the tab 38. The sides 46 of each panel preferably contact a side 46 of a different panel in the collapsed or stowed position as in FIGS. 1-2. The overall shape of each panel 30 is generally rectangular with slanted first sides 46 and end 44 forming a top of the rectangle, with the second parallel sides 48 forming two opposing sides of the rectangle, and with the third sides 50 forming the bottom of the rectangle. The tab 38 extends from the bottom of that generally rectangular shape, with the tab 38 opposite the serrated end 44. The angled first sides 46 are at an angle of about 120° to the end 50 so that three panels 30 can lay adjacent each other with the first sides 46 of two adjacent panels contacting each other and resting against the top of the collar 20. As the number of panels increases, the inclination angle of the first side would alter to allow the described contact with the other panel(s) and collar. If the panels 30 are interleaved rather than planar as in FIGS. 9-10, the offset of the legs 34 can be varied to accommodate the increased height from stacking panels on top of each other.

Each panel 30 may have optional stiffening ribs 52 adjacent to and extending along at least a portion of the periphery of the panel. The panels 30 may be stamped from metal with the stiffening ribs 52 forming a raised surface on one side of the panel 30 and a recessed surface on the opposing side of the panel. The characterization of the panels 30 as substantially planar accommodates the variation in thickness caused by these ribs.

Figure 3:
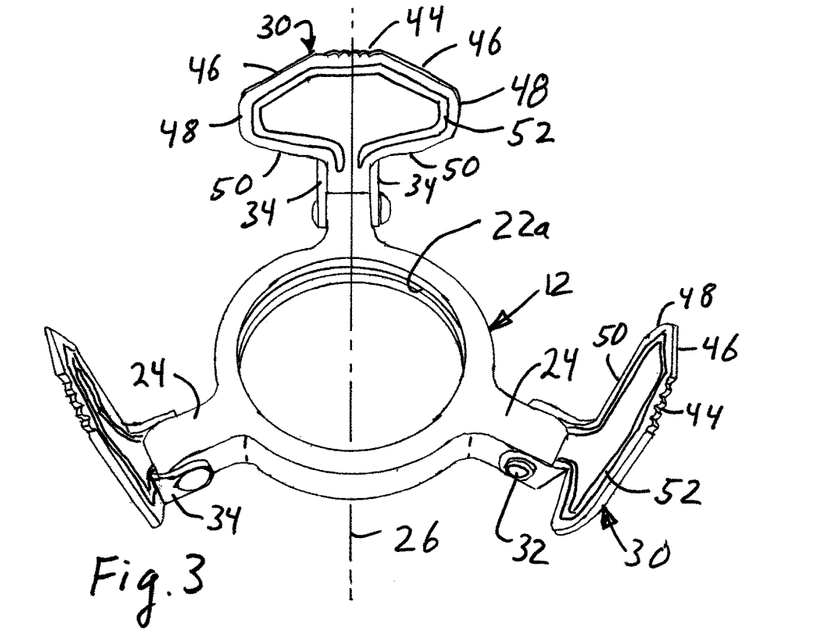
FIG. 3 is a top perspective view of the collar and panels of FIG. 1 in a fully deployed configuration.

Referring to FIGS. 3-4, in the deployed configuration, the relative positions are changed as the tab 38 and third sides 50 are closest to the axis 38, with generally parallel second sides 48 being further from the axis 26, with slanted first sides 46 being still further from the axis and with end 44 being the most distant from the axis 26.

Referring to FIGS. 3-6, the internal threads 22a on the opening in collar 20 are configured to threadingly engage or mate with corresponding external threads 22b on the neck 62 of fuel container 60. The fuel container 60 has a body formed by a bottom, 64, sidewall 66, top 68 and upper rim 70. The depicted fuel container is shown as a cylindrical can having a closed bottom 64 with a curved sidewall 66 joined to a generally flat top 68 from the center of which the neck 62 extends. The fuel in the container may vary, including gelled alcohol, gelled methanol, and liquid, glycol-based wicked fuel. The following description refers to the wicked fuel but other fuel containers may be used. An upper rim 70 encircles the juncture of the sidewall and the top, with a wick 72 extending from an opening defined by the neck 62. A removable cap (not shown) may close the opening in the neck 62. The cap (not shown) may take the form of a cylindrical cup with a threaded skirt or a hat-shaped, flanged plug that is press-fit into the opening formed by the neck.

The fuel container 60 is preferably a can of chafing dish fuel such as Sterno® brand fuel and is preferably a glycol based fuel or other fuel burning with a wick. This brand of fuel uses containers that are about 3 and ⅜ inches in diameter with a neck about 2 and ⅛ inches in diameter, but the specific dimensions can vary. The height of the container can vary depending on the amount of fuel in the container.

The threads 22b on the neck 62 and the construction of the collar 20 are selected to allow the collar to be threaded sufficiently toward the top 68 that the collar 20 contacts the body of the container 20, preferably contacting the upper rim 70 at the outer end of the projections 24. Likewise, the deployment of the panels 30 advantageously allows a portion of the legs 34 to contact the fuel container 60 preferably at the upper rim 70. This contact allows the collar 20 to transfer weight to the container through the threaded engagement at the neck 62 and through contact with the outer periphery of the container body, preferably through the rim 70. The wider load dispersion at the rim 70 is believed to provide a more stable support and improved load distribution.

Figures 7, 8:
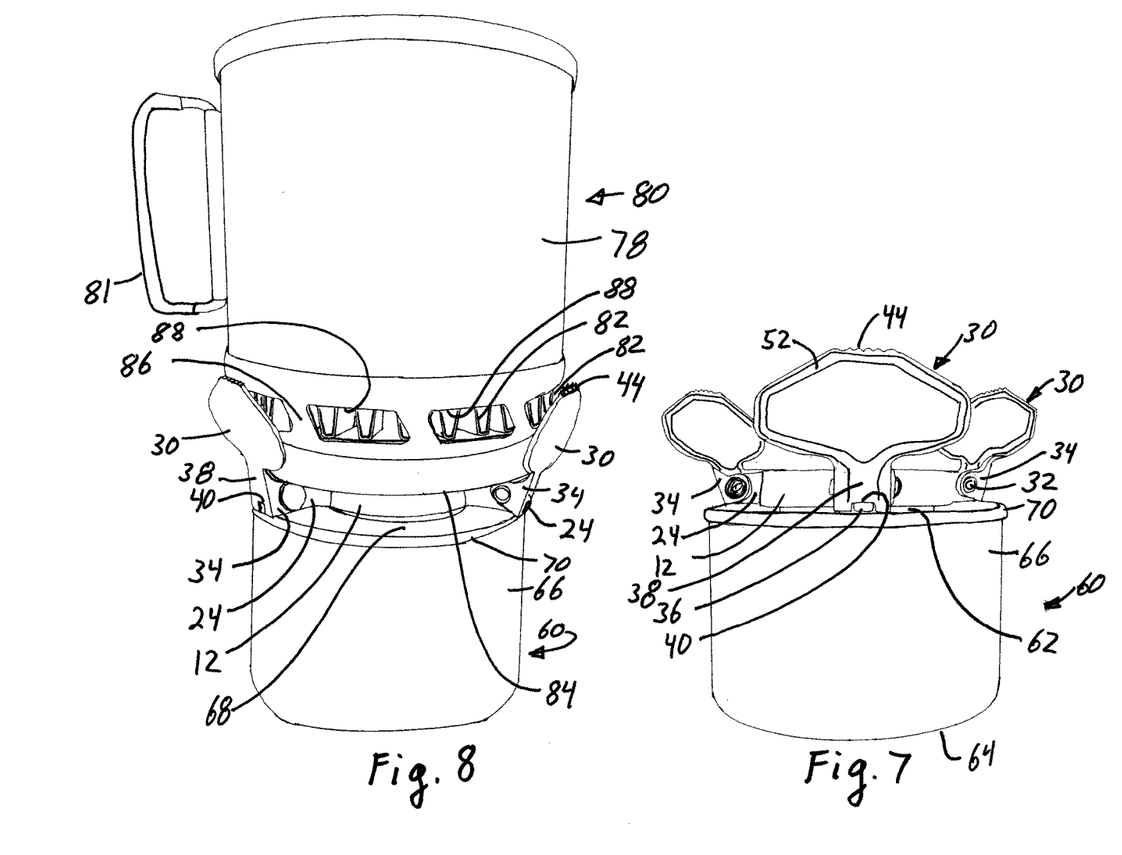
FIG. 7 is a side perspective view of the container, collar and panels of FIG. 5.
FIG. 8 is a side perspective view of a cooking container on the container, collar and panels of FIG. 7.

Referring to FIGS. 7-8, a cooking container 80 with a handle 81 that is hinged so it can fold against the sides of the container, may be placed on the collar 20 when the panels 30 are deployed. The container 80 has a closed bottom 79 (FIG. 7) and a sidewall 78 defining an open top that may be removably closed with a lid as known in the art. The cooking container 80 has a bottom edge that may be offset from the closed bottom (FIG. 7) of the cooking container and that is sized to fit rest against the collar 20 adjacent the juncture of the collar with the panels 30. The inward facing surface of the legs 34 may be configured to conform to the shape of the corner 84 of the bottom 79 of the cooking container 80, with the container corner 84 resting on the legs 34, the protrusions 24, or both.

A heat exchanger 82 in the form of an annular shaped, corrugated aluminum ring that is connected to the bottom of the container so gases may pass through the ring radially, is believed suitable. A curved corner 84 and a generally corresponding curvature on the inward facing surface of the legs 34 are believed suitable. The cooking container 80 advantageously has a heat exchanger 82 within a depending skirt 86 on the bottom of the cooking container 80. The skirt 86 may have openings or vents 88 to allow heated gases to pass through the heat exchanger 82 and out the vents air and gas to pass through the openings 88. Cooking containers with such vented heat exchangers are known in the art.

The collar 20 spaces the bottom part of the cooking container 82 apart from the top rim 70 and top surface 68 of the fuel container 60. That spacing allows air to enter for the burning of the fuel in the container 60. The location of the collar 20 on the neck 62 places the wick 62 at the very bottom of the skirt and preferably slightly inside the skirt 86 of the cooking container 80. Combustion gases and heated air from the burning fuel and wick 72 pass through the opening between the projections 32, the fuel container's top 68 and the bottom skirt 86 of the cooking container 80. The hot gases from the wick 72 heat the bottom of the container 80 directly and by passing through and heating the heat exchanger 82 that is in thermal communication with the closed bottom of the cooking container 80. The skirt openings 88 are advantageously spaced around a circumference of the skirt 86 and by rotating the cooking container 80 the panels 30 may overlap larger or smaller portions of the skirt openings 88 to act as a windbreak and vary the flow of heated gases.

In the above described configuration the cooking container 80 is located inside the deployed panels 30 with the main weight of the cooking container passing to the collar 20 through the legs 34, projections 24 and threaded central portion of the collar 20. The collar transfers that weight to the fuel container 60 through the fuel container's neck 12 and the contact at the periphery of the collar through the rim 70. The panels 30 help keep the cooking container 60 from moving laterally away from the axis 26 and falling off.

Figure 6:
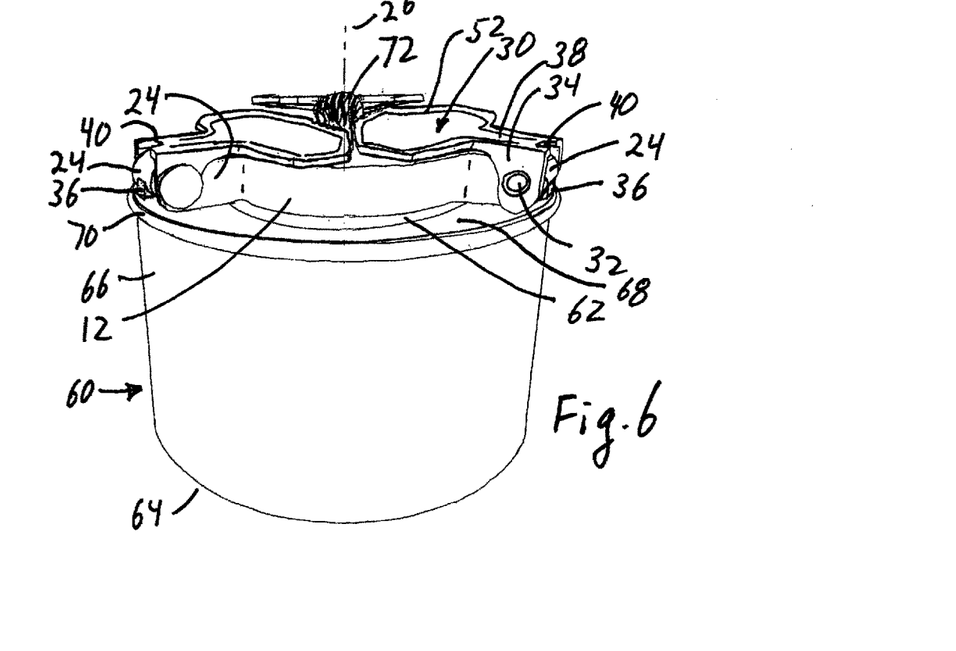
FIG. 6 is a side perspective view of the container of FIG. 5 with the panels in a collapsed configuration.

Referring to FIG. 6, the panels 30 may be folded onto the wick 72 to extinguish the burning wick. Alternatively, if the opening in the neck 62 of the fuel container 60 is plugged so as to allow the collar 20 to be threaded onto the container neck, then the panels 30 may be folded to the collapsed configuration abutting the plug and collar similar to the configuration shown in FIG. 6, but with the wick being held inside the container by the sealing plug.

Referring to FIG. 9, if the cooking container 60 takes the form of a frying pan or other container that has a bottom 79 that is too large to rest on the collar or legs inside the deployed panels 30, then the cooking container is preferably large enough that the bottom 79 of the cooking container extends beyond the textured ends 44 of the deployed panels 30. The textured ends 44 are advantageously configured to increase the engagement of the ends 44 with the bottom 79 of the cooking container 80. Because there are three panels, the panel ends 44 define a plane to allow easier leveling of the cooking container 80. Because the panels are inclined outward and away from the vertical axis 26 or an axis parallel thereto, the weight of the cooking container on the panels 30 exerts a bending force that is reacted by the legs 34 pressing against the top of the fuel container 60 and by the hinge shaft 28. The legs 34 have a U-shaped or channel shaped cross section between the hinge shaft 28 and the contact with the top of the fuel container, preferably at the rim 70, and that provides a sturdy shape that is believed sufficient to carry the typical weight of the cooking container and its contents. The bending force increases as the inclination angle of the panels 30 increases from the vertical, so the angles of panels 30 away from the vertical are preferably limited. Depending on the size and configuration of the cooking container 80, the configuration and materials used for the legs 34 and panels 30 may be varied to support a predetermined load, with the angle of inclination of panels having a noticeable effect on the design. An outward angle of about 15° to 30° from a vertical axis 26 is believed suitable, and an angle of up to about 45° from that vertical axis is also believed workable. Those deployed angles correspond to an angle of about 105° to 120° from the generally horizontal plane of the top of the collar 20, with an angle of about 155° from that horizontal plane of the collar being believed workable but less desirable. Large angles are undesirable as the size and materials of the panels 30, legs 34 and hinge shaft 32 that are needed to transfer the weight from the cooking container may make the resulting weight, size, shape or materials of the collar 20 and panels 30 undesirable. The outward inclination of the panels 30 also affects the ability of the panel to act as a windscreen because the lateral area available for blocking wind decreases as the angle increases.

The collar 20 and panels 30 thus provide a small, compact and light weight support for a cooking container 80 when the collar is fastened to chafing dish fuel container 60. Advantageously, a kit may be provided that includes the collar 20 and panels 30, along with one or more fuel containers 60. The kit may optionally include one or more cooking containers 30 configured to work with the specific configuration of the collar 20 and panels 30. The kit may include the collar 20 connected to the threaded neck 62 of the fuel container, or unconnected.

The method of using the collar 20 and panels 30 includes fastening the collar 20 to the neck of the fuel container. The panels 30 may be collapsed or deployed during the fastening step but are preferably collapsed against the top of the collar. The fastening step is preferably achieved by rotation and more preferably by rotating threads on the collar into engagement with threads on the neck of the fuel container. The fastening step advantageously causes the outer periphery of the collar to contact an outer portion of the fuel container, preferably the top rim of the fuel container. If the fuel container neck is covered by a threaded cap the cap is removed before the collar is fastened to the neck. If the fuel container neck is covered by a plug having a periphery not blocked by the threaded engagement of the collar onto the neck, the plug may be removed before or after the collar is fastened to the neck of the fuel container. The fuel assembly is then ready for use by lighting the fuel, preferably by lighting the wick 72. Before igniting the fuel, the fuel container 60 is preferably, but optionally placed on a desired, level location. A cooking container 80 may be placed on the collar 20 and/or legs 34, or on the ends 44 of the deployed panels, before or after the fuel is ignited. The fuel is preferably ignited before the cooking container 80 is placed on the panels or collar. Some configurations of the collar and panels may restrict access to ignite the fuel when the cooking container is placed on the collar and panels.

The above description has two legs 34 straddling a projection 24 to form a hinged joint, but other hinged joints can be used, including a projection 24 with a central notch into which a single, central portion of the panel extends. Likewise, different rotations stops can be used to limit the rotation of the panels 30 relative to the collar 20 and projection 24, including placing abutting parts or projections at various locations on each of the collar and panel but located so they contact each other to limit rotation. Additionally, the top rim 70 of the fuel container 60 may be used to limit rotation of the panel 30 by engaging a portion of the leg 34, and that is shown in the figures. The shaft 32 is described as a rivet but different rotational shafts could be used, including bolts or hinge pins held in position by various means, including threaded fasteners, enlarged ends, deformation or removable keys. The collar 20 is described for use with a commonly available container of chafing dish fuel, but the design may be suitable for use with different fuel containers 60 having a threaded neck. While threads 22a, 22b are described as releasably connecting collar 20 to the neck 62 of the fuel container 60, various rotatable connections can be used, including various forms of bayonet connections, pin and groove connections, over-centered cam connections and other ways of releasably connecting the parts. The threads 22 are preferably multiple lead threads defining an opening of a preferred embodiment of about two inches in diameter. From 2-6 projections are believed suitable and three projections are preferred.

The collar 20 is preferably made of metal, and is advantageously made of stainless steel, aluminum, or combinations thereof. Metals that do not rust are preferred. The rotating pivot is preferably of stainless steel for increased strength, or made of aluminum for ease of deformation when the collar is of aluminum. When made of aluminum, the collar and three abutting panels weigh about 10 ounces when the collar is about ½ inch thick and the projections are about 1 and ⅝ inches from the longitudinal axis, and the panels have a length of about 1.5 inches from the rotational axis of each panel, with the outer edges of the panels 30 in the deployed position being about 3 to 4 inches from the longitudinal axis.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of releasably connecting the collar to the fuel container and of connecting the rotating panels to the collar. Further, the various features of this invention can be used alone, or in varying combinations with each other and are not intended to be limited to the specific combination described herein. Thus, the invention is not to be limited by the illustrated embodiments.

What is claimed is:

1. A portable, collapsible holder for a cooking container, the holder being releasably connectable to a fuel container having a neck and a top rim, comprising:
    a collar having an opening therethrough forming an inward facing surface configured to rotatably engage the neck during use of the holder, the opening having a longitudinal axis;
    several panels each rotatably connected to the collar with an offset hinge, each panel rotating between a first collapsed position in which the panels are generally parallel to a top surface of the collar and a second position in which the panels are in a deployed position with the panels rotated at an angle of 105 to 155 degrees outward from the top surface of the collar; and
    a rotation stop on at least one of the panel and collar to limit the motion of each of the several panels beyond the deployed position.

2. The portable, collapsible holder for a cooking container of claim 1, wherein there are three panels each configured to contact the top surface of the collar in the first, collapsed configuration.

3. The portable, collapsible holder for a cooking container of claim 2, wherein when the panels are in the first, collapsed configuration each of the three panels has two opposing sides inclined at an angle of 120 degrees to each other.

4. The portable, collapsible holder for a cooking container of claim 2, wherein each panel has an outermost side in the second, deployed configuration which outermost sides are in substantially the same plane and orthogonal to the longitudinal axis.

5. The portable, collapsible holder for a cooking container of claim 4, wherein the outermost side is textured.

6. The portable, collapsible holder for a cooking container of claim 2, further comprising the fuel container and wherein the opening in the collar is threadingly engaged with the external threads on the neck of the fuel container.

7. The portable, collapsible holder for a cooking container of claim 1, wherein there are three panels, each having a second, deployed position between 105 to 125 degrees.

8. The portable, collapsible holder for a cooking container of claim 1, wherein there are three panels each rotatably connected to a different one of three, equally spaced, outwardly extending projections of the collar, the projections extending outward a distance sufficient so each projection may contact the top rim of the fuel container during use of the holder.

9. The portable, collapsible holder for a cooking container of claim 8, wherein there are three panels, each having a second, deployed position between 105 to 125 degrees.

10. The portable, collapsible holder for a cooking container of claim 8, wherein when the panels are in the first, collapsed configuration each of the three panels has two opposing sides inclined at an angle of 120 degrees to each other, and wherein each panel has an outermost side in the second, deployed configuration which outermost sides are in substantially the same plane which is orthogonal to the longitudinal axis, and wherein the outermost side is textured.

11. The portable, collapsible holder for a cooking container of claim 1, wherein there are three panels each configured to interleave with another panel one of which is in contact with the top surface of the collar in the first, collapsed configuration.

12. The portable, collapsible holder for a cooking container of claim 1, wherein there are three panels and the collar has an annular shape with three outward extending projections and a different panel rotatably connected to a different one of the three projections, and wherein the threaded opening in the collar has a diameter of 1 and ⅜ inch with multiple lead threads, and wherein the collar is made of metal and is less than ¾ inches thick measured parallel to the longitudinal axis.

13. The portable, collapsible holder for a cooking container of claim 1, wherein the opening in the collar has internal threads configured to threadingly engage mating external threads on the neck of the fuel container during use.

14. A portable stove kit, comprising:
a container of ethanol, methanol or glycol based fuel, the container having a neck extending from a top surface of the container, the neck defining an opening for access to the fuel for burning, the container having a top rim connected to the top surface;
a collar having an opening extending through the collar and configured to rotatably engage the neck of the container during use;
several panels each rotatably connected to the collar with an offset hinge, each panel rotating between a first collapsed position in which the panels are generally parallel to a top surface of the collar and a second position in which the panels are in a deployed position with the panels rotated at an obtuse angle of 105 to 155 degrees outward from the top surface of the collar, the collar and panels configured so at least one of the collar and panels can rest against the top rim when the panels are in the second, deployed position during use;
a rotation stop on at least one of the collar and each panel to limit rotation beyond the deployed position of each of the several panels.

15. The kit of claim 14, further comprising a cooking container having a bottom configured to fit within a juncture of the panels and the collar when the cooking container during use, and wherein the container of fuel contains a glycol-based fuel with a wick.

16. The kit of claim 14, wherein there are three panels each configured to contact the top surface of the collar in the first, collapsed configuration.

17. The kit of claim 14, wherein the collar is threadingly engaged with the neck of the fuel container.

18. The kit of claim 14, wherein each panel has an outermost side in the second, deployed configuration which outermost sides are in substantially the same plane.

19. The kit of claim 18, further comprising a cooking container having a bottom configured to rest upon and extend beyond the three outermost sides of the panels when the panels are in the second, deployed position.

20. The kit of claim 18, wherein the outermost side of at least one panel is textured.

21. The kit of claim 16, wherein when the panels are in the first, collapsed configuration each of the three panels has two opposing sides inclined at an angle of 120 degrees to each other.

22. The kit of claim 14, wherein there are three panels, each having a second, deployed position between 105 to 125 degrees.

23. The kit of claim 22, wherein there are three panels each rotatably connected to a different one of three, equally spaced, outwardly extending projections of the collar, the projections extending outward a distance sufficient to contact the top rim during use of the holder.

24. The kit of claim 14, wherein there are three panels each configured to interleave with another panel one of which is in contact with the top surface of the collar in the first, collapsed configuration.

25. The kit of claim 14, wherein there are three panels and the collar has an annular shape with three outward extending projections and a different panel rotatably connected to a different one of the three projections, and wherein the threaded opening in the collar has a diameter with internal threads configured to engage mating threads on the neck, and wherein the collar is made of metal and is less than ¾ inches thick measured parallel to the longitudinal axis.

26. The kit of claim 14, wherein the opening in the collar has internal threads configured to threadingly engage mating external threads on the neck of the fuel container during use.

* * * * *